United States Patent
Wu et al.

(10) Patent No.: US 11,445,036 B1
(45) Date of Patent: Sep. 13, 2022

(54) CLUSTER MANAGEMENT METHOD AND APPARATUS, ELECTRONIC DEVICE AND STORAGE MEDIUM

(71) Applicant: SENSETIME INTERNATIONAL PTE. LTD., Singapore (SG)

(72) Inventors: Jiacheng Wu, Singapore (SG); Shuai Zhang, Singapore (SG); Jinliang Lin, Singapore (SG); Gan Xiao, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 17/363,176

(22) Filed: Jun. 30, 2021

Related U.S. Application Data (63) Continuation of application No. PCT/IB2021/055739, filed on Jun. 28, 2021.

(30) Foreign Application Priority Data

Jun. 25, 2021 (SG) .......................... 10202107015X (51) Int. Cl.
*G06F 15/173* (2006.01)
*H04L 67/60* (2022.01)
*H04L 41/0893* (2022.01)
*H04L 41/0866* (2022.01)
*H04L 67/12* (2022.01)

(52) U.S. Cl.
CPC .......... *H04L 67/32* (2013.01); *H04L 41/0866* (2013.01); *H04L 41/0893* (2013.01); *H04L 67/12* (2013.01)

(58) Field of Classification Search
CPC . H04L 67/32; H04L 41/0866; H04L 41/0893; H04L 67/12
See application file for complete search history.

(56) References Cited

U.S. PATENT DOCUMENTS

2015/0094049 A1* 4/2015 Hamada .............. H04L 65/1093
455/416
2019/0087568 A1 3/2019 Kim et al.

FOREIGN PATENT DOCUMENTS

CN 108234450 A 6/2018
CN 108848025 A 11/2018
(Continued)

OTHER PUBLICATIONS

International Search Report in the international application No. PCT/IB2021/055739, dated Nov. 3, 2021, 5 pgs.
(Continued)

*Primary Examiner* — Thanh T Nguyen
(74) *Attorney, Agent, or Firm* — Cooper Legal Group, LLC (57) ABSTRACT

Provided are a cluster management method and apparatus, an electronic device and a storage medium. The method includes that: in a case where a registration request sent by a target device is received, identity information of the target device is acquired from the registration request; identity check is performed on the target device based on the identity information to obtain a check result; in a case where the check result is a check success, node information of the target device is acquired from the registration request; and the node information is stored to registration information of a device cluster network, to add the target device to the device cluster network.

12 Claims, 4 Drawing Sheets

(56) References Cited

FOREIGN PATENT DOCUMENTS

| | | |
|---|---|---|
| CN | 111222174 A | 6/2020 |
| CN | 112788150 A | 5/2021 |

OTHER PUBLICATIONS

Written Opinion of the International Search Authority in the international application PCT/IB2021/055739, dated Nov. 3, 2021, 6 pgs.
Written Opinion of the Singaporean application No. 10202107015X, dated Nov. 8, 2021, 10 pgs.

\* cited by examiner

CLUSTER MANAGEMENT METHOD AND APPARATUS, ELECTRONIC DEVICE AND STORAGE MEDIUM

CROSS-REFERENCE TO RELATED APPLICATIONS

This is continuation application of international application PCT/IB2021/055739, filed on 28 Jun. 2021, which claims priority to Singaporean patent application No. 10202107015X, filed with IPOS on 25 Jun. 2021. The contents of international application PCT/IB2021/055739 and Singaporean patent application No. 10202107015X are incorporated herein by reference in their entireties.

TECHNICAL FIELD

The disclosure relates to the technical field of computer communications, and more particularly, to a cluster management method and apparatus, an electronic device and a storage medium.

BACKGROUND

In the field of Internet of Things (IoT), a completed system project typically involves a large number of electronic devices, each serving as a node in a network, to form a device cluster network.

At present, the electronic devices in the device cluster network are often adjusted according to changes of actual requirements and application scenarios, for example, an electronic device that breaks down and requires upgrading to hardware in the device cluster network needs to be replaced, an electronic device is added in the device cluster network, etc. Correspondingly, changes are made to information of the device cluster network. In general cases, for the change of the electronic device in the device cluster network, corresponding node information often needs to be manually adjusted by a user at a cloud server that manages the device cluster network, the cluster management is therefore low in efficiency and intelligence.

SUMMARY

The embodiments of the disclosure are intended to provide a cluster management method and apparatus, an electronic device and a storage medium.

The technical solutions in the embodiments of the disclosure are implemented as follows.

The embodiments of the disclosure provide a cluster management method, which may include the following operations.

In a case where a registration request sent by a target device is received, identity information of the target device is acquired from the registration request.

Identity check is performed on the target device based on the identity information to obtain a check result.

In a case where the check result is a check success, node information of the target device is acquired from the registration request.

The node information is stored to registration information of a device cluster network, to add the target device to the device cluster network.

In some embodiments, the identity information may include attribute information and a digital certificate of the target device, and the operation that the identity check is performed on the target device based on the identity information to obtain the check result may include the following operations.

Effectiveness verification is performed on the target device by using the attribute information to obtain a first verification result.

Legality verification is performed on the digital certificate to obtain a second verification result.

In a case where both the first verification result and the second verification result are a verification success, it is determined that the check result is a check success.

In a case where either the first verification result or the second verification result is a verification failure, it is determined that the check result is a check failure.

In some embodiments, the node information may include device information and network interface information of the target device, and the operation that the node information is stored to the registration information of the device cluster network may include the following operations.

The network interface information is searched from the registration information.

In a case where the network interface information is found, device information associated with the network interface information in the registration information is updated to the device information; and/or in a case where the network interface information is not searched, the device information and the network interface information are newly added to the registration information.

In some embodiments, after the node information is stored to the registration information of the device cluster network, the method may further include the following operation.

In a case where state information reported by the target device is received, the node information in the registration information and last connection time of the target device are updated according to the state information.

In some embodiments, after the node information is stored to the registration information of the device cluster network, the method may further include the following operations.

In a case where state information reported by the target device is not received within a preset length of time, a temporary departure identifier corresponding to the target device is queried from the registration information.

In a case where the temporary departure identifier is queried, the node information is retained in the registration information; and/or in a case where the temporary departure identifier is not queried, the node information is deleted from the registration information, to remove the target device from the device cluster network.

The embodiments of the disclosure provide a cluster management apparatus, which may include an acquisition module, a check module and a management module.

The acquisition module is configured to acquire, in a case where a registration request sent by a target device is received, identity information of the target device from the registration request.

The check module is configured to perform identity check on the target device based on the identity information to obtain a check result.

The acquisition module is further configured to acquire, in a case where the check result is a check success, node information of the target device from the registration request.

The management module is configured to store the node information to registration information of a device cluster network, to add the target device to the device cluster network.

In some embodiments, the identity information may include attribute information and a digital certificate of the target device, and the check module is specifically configured to: perform effectiveness verification on the target device by using the attribute information to obtain a first verification result; perform legality verification on the digital certificate to obtain a second verification result; determine, in a case where both the first verification result and the second verification result are a verification success, that the check result is a check success; and/or determine, in a case where either the first verification result or the second verification result is a verification failure, that the check result is a check failure.

In some embodiments, the node information may include: device information and network interface information of the target device, and the management module is specifically configured to search the network interface information from the registration information; update, in a case where the network interface information is found, device information associated with the network interface information in the registration information to the device information; and/or newly add, in a case where the network interface information is not found, the device information and the network interface information to the registration information.

In some embodiments, the management module is further configured to update, in a case where state information reported by the target device is received, the node information in the registration information and last connection time of the target device according to the state information.

In some embodiments, the management module is further configured to query, in a case where state information reported by the target device is not received within a preset length of time, a temporary departure identifier corresponding to the target device from the registration information; retain, in a case where the temporary departure identifier is queried, the node information in the registration information; and/or delete, in a case where the temporary departure identifier is not queried, the node information from the registration information, to remove the target device from the device cluster network.

The embodiments of the disclosure provide an electronic device, which may include: a processor, a memory and a communication bus.

The communication bus is configured to implement connection and communication between the processor and the memory.

The processor is configured to execute one or more programs stored in the memory, to implement the cluster management method.

The embodiments of the disclosure provide a computer-readable storage medium, which stores one or more programs; and the one or more programs may be executed by one or more processors, to implement the cluster management method.

The embodiments of the disclosure provide the cluster management method and apparatus, the electronic device and the storage medium. The method includes that: in a case where a registration request sent by a target device is received, identity information of the target device is acquired from the registration request; identity check is performed on the target device based on the identity information to obtain a check result; in a case where the check result is a check success, node information of the target device is acquired from the registration request; and the node information is stored to registration information of a device cluster network, to add the target device to the device cluster network. According to the technical solutions provided by the embodiments of the disclosure, the cluster management apparatus automatically discovers a target device needing to be added to the device cluster network, and adds the target device to the device cluster network in a case where the identity check on the target device succeeds, thereby improving efficiency and intelligence of the cluster management.

DETAILED DESCRIPTION

A clear and complete description on the technical solutions in the embodiments of the disclosure will be given below, in combination with the accompanying drawings in the embodiments of the disclosure.

The embodiments of the disclosure provide a cluster management method. The execution main body may be a cluster management apparatus. For example, the cluster management method may be executed by a terminal device or a server or other electronic devices. The terminal device may be User Equipment (UE), a mobile device, a user terminal, a cell phone, a cordless phone, a Personal Digital Assistant (PDA), a handheld device, a computing device, a vehicle-mounted device, a wearable device, etc. In some possible implementation modes, the cluster management method may be implemented by enabling a processor to call a computer-readable instruction stored in a memory.

Figure 1:
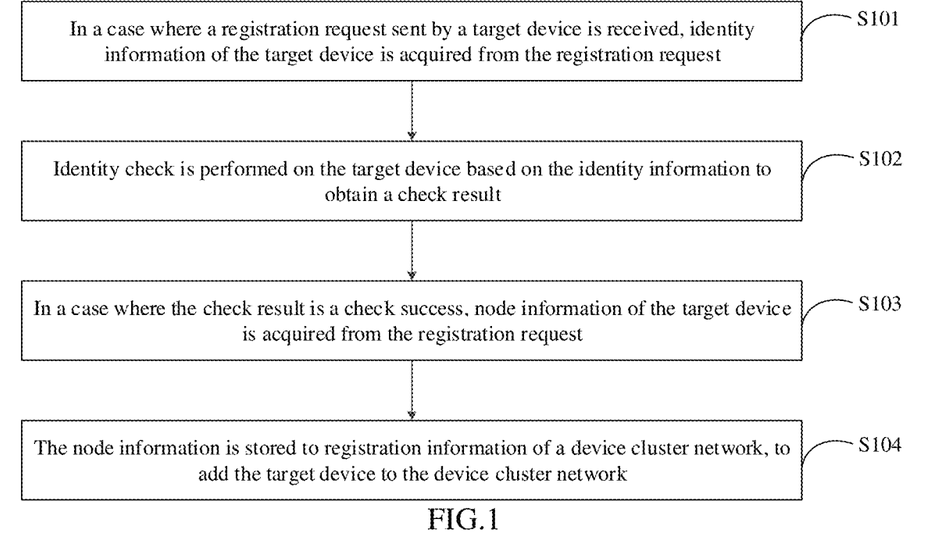
FIG. 1 is a schematic diagram of a flowchart of a cluster management method provided by an embodiment of the disclosure.

FIG. 1 is a schematic diagram of a flowchart of a cluster management method provided by an embodiment of the disclosure. As shown in FIG. 1, in the embodiment of the disclosure, the cluster management method may mainly include the following steps.

In S101, in a case where a registration request sent by a target device is received, identity information of the target device is acquired from the registration request.

In the embodiment of the disclosure, the cluster management apparatus acquires the identity information of the target device from the registration request in the case where the registration request sent by the target device is received.

It is to be noted that, in the embodiment of the disclosure, the target device may be any device needing to be added to the device cluster network managed by the cluster management apparatus, and may be a device such as a mobile phone and a tablet. There are no limits made on the specific target device in the embodiment of the disclosure.

It is to be noted that, in the embodiment of the disclosure, the cluster management apparatus may manage the device cluster network. The device cluster network may include one or more electronic devices. The target device may send the registration request to the cluster management apparatus, to request to join the device cluster management network and accept management from the cluster management apparatus.

It is to be noted that, in the embodiment of the disclosure, the registration request sent by the target device to the cluster management apparatus includes identity information of the target device. The cluster management apparatus may analyze the registration request to obtain the identity information. The specific identity information may include attribute information and a digital certificate of the target device, for checking the legality of the target device. The attribute information may be information such as the device model, software version and hardware version of the target device, and is not limited in the embodiment of the disclosure.

In S102, identity check is performed on the target device based on the identity information to obtain a check result.

In the embodiment of the disclosure, after acquiring the identity information of the target device, the cluster management apparatus may perform the identity check on the target device based on the identity information to obtain the check result.

Specifically, in the embodiment of the disclosure, the identity information of the target device may include attribute information and a digital certificate; and the cluster management apparatus performs the identity check on the target device based on the identity information, which may include that: effectiveness verification is performed on the target device by using the attribute information to obtain a first verification result; legality verification is performed on the digital certificate to obtain a second verification result; in a case where both the first verification result and the second verification result are a verification success, it is determined that the check result is a check success; and/or, in a case where either the first verification result or the second verification result is a verification failure, it is determined that the check result is a check failure.

It is to be understood that, in the embodiment of the disclosure, the cluster management apparatus performs the identity check on the target device, and may perform the check from two aspects. One aspect is to check whether the target device is an effective device, and the other aspect is to check the legality of the digital certificate of the target device. The cluster management apparatus determines the check result of the identity check on the target device as the check success only in a case where the verification succeeds in both aspects, or otherwise, determines the check result as the check failure.

It is to be noted that, in the embodiment of the disclosure, the cluster management device verifies whether the target device is the effective device, and the attribute information used may include information such as the device model of the target device. The cluster management apparatus may determine whether to support management on the target device according to a device signal and other information, thereby determining whether the target device is the effective device. Certainly, the cluster management apparatus may also perform the effectiveness verification on the target device based on the attribute information according to other special rules, which is not limited in the embodiment of the disclosure.

In S103, in a case where the check result is a check success, node information of the target device is acquired from the registration request.

In the embodiment of the disclosure, the cluster management apparatus further acquires the node information of the target device from the registration request in the case where the check result of the target device is the check success.

It is to be noted that, in the embodiment of the disclosure, the cluster management apparatus may analyze the registration request to obtain the node information of the target device. The node information is information that needs to be provided by the target device to serve as one node in the device cluster network, and may include device information and network interface information of the target device. The device information may include basic information and state information of the device, for example, the physical position, network address, device model, hardware version, software version and other related information of the target device; and the network interface information is information of a network interface to which the target device is accessed. There are no limits made on the specific node information in the embodiment of the disclosure.

In S104, the node information is stored to registration information of a device cluster network, to add the target device to the device cluster network.

In the embodiment of the disclosure, after acquiring the node information of the target device, the cluster management apparatus may store the node information to the registration information of the device cluster network, to add the target device to the device cluster network.

It is to be noted that, in the embodiment of the disclosure, the registration information of the device cluster network may be presented in the form of a registration table, i.e., the cluster management apparatus may store the node information to the registration table. In this way, the target device is added to the device cluster network.

Figure 2:
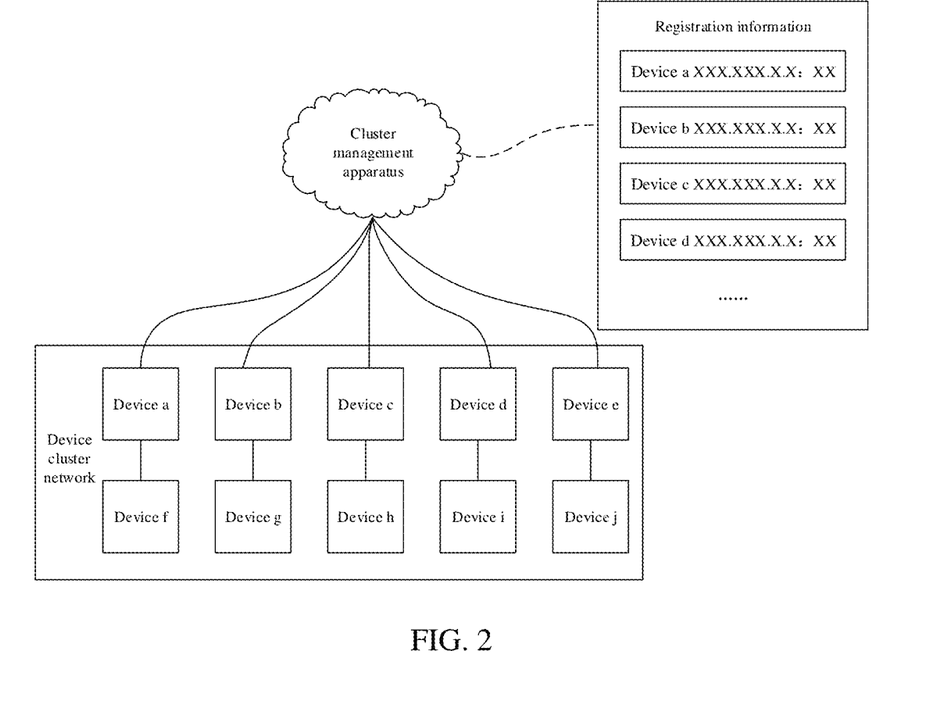
FIG. 2 is a schematic diagram of exemplary network architecture provided by an embodiment of the disclosure.

FIG. 2 is a schematic diagram of exemplary network architecture provided by an embodiment of the disclosure. As shown in FIG. 2, the device cluster network may include multiple devices. The cluster management apparatus may manage the device cluster network. The registration information included by the cluster management apparatus includes node information of each device in the device cluster network, such as an Internet Protocol (IP) address.

Specifically, in the embodiment of the disclosure, the node information includes: device information and network interface information of the target device; and the cluster management apparatus stores the node information to the registration information of the device cluster network, which may include that: the network interface information is searched from the registration information; in a case where the network interface information is found, device information associated with the network interface information in the registration information is updated to the device information; and/or, in a case where the network interface information is not found, the device information and the network interface information are newly added to the registration information.

It is to be understood that, in the embodiment of the disclosure, the node information may include the device information and the network interface information of the target device, and the network interface information is related information of the network interface to which the target device accesses. As the accessed device may be changed for one network interface, the network interface to which the target device is accessed may have other devices accessed before the target device is accessed, and the other devices are added to the device cluster network. Therefore, in the registration information, the network interface of the network interface may be stored. The device information associated with the network interface information, however, is device information of the other devices, so the cluster management apparatus may first search whether the network interface information is present in the registration information, only updates the device information of the target device to the registration information if yes, and adds the device information and the network interface information to the registration information at the same time if no.

Figure 3:
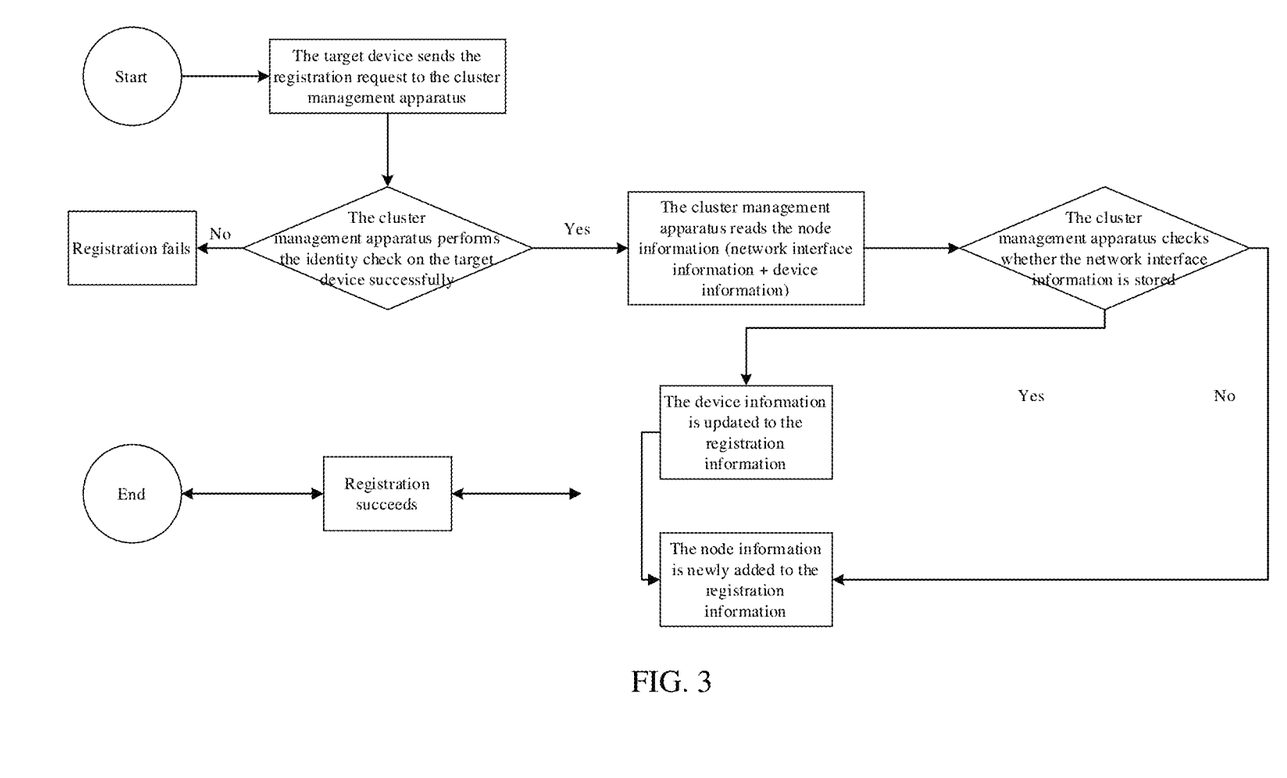
FIG. 3 is a schematic diagram of an exemplary flowchart of addition of a target device to a device cluster network provided by an embodiment of the disclosure.

FIG. 3 is a schematic diagram of an exemplary flowchart of addition of a target device to a device cluster network provided by an embodiment of the disclosure. As shown in FIG. 3, the target device may first send the registration request to the cluster management apparatus; and the cluster management apparatus performs the identity check on the target device, reads the node information in a case where the check succeeds, and further checks whether the registration information includes the network interface information in the node information, thereby updating or newly adding the node information, and adding the target device to the device cluster network. In addition, in a case where the check on the target device is failed, the cluster management apparatus may directly determine that the registration fails and does not execute the step of adding the target device to the device cluster network.

It is to be understood that, in the embodiment of the disclosure, the cluster management apparatus automatically discovers a target device needing to be added to the device cluster network, and adds the target device to the registration information of the device cluster network in a case where the identity check on the target device succeeds, such that the target device is added to the device cluster network, and the user is unnecessary to manually input related information of the target device to the cluster management apparatus. By adding the target device to the device cluster network, the cluster management efficiency and intelligence are improved.

In the embodiment of the disclosure, after storing the node information to the registration information of the device cluster network, the cluster management apparatus may further execute the following step: in a case where state information reported by the target device is received, the node information in the registration information and last connection time of the target device are updated according to the state information.

It is to be understood that, in the embodiment of the disclosure, the target device may report its own state information to the cluster management apparatus after added to the device cluster network; and in the case where that the state information is received, the cluster management apparatus may update the node information in the registration information and the last connection time of the target device.

In the embodiment of the disclosure, after storing the node information to the registration information of the device cluster network, the cluster management apparatus may further execute the following steps: in a case where state information reported by the target device is not received within a preset length of time, a temporary departure identifier corresponding to the target device is queried from the registration information; in a case where the temporary departure identifier is queried, the node information is retained in the registration information; and/or, in a case where the temporary departure identifier is not queried, the node information is deleted from the registration information, to remove the target device from the device cluster network.

It is to be understood that, in the embodiment of the disclosure, if the cluster management apparatus does not receive the state information reported by the target device within the preset length of time, it is indicated that the target device is off-line and does not work normally. By this time, it is possible that the user actively controls the target device to suspend the work for some reasons, and will continue to use the target device. In fact, the user sets in advance the corresponding temporary departure identifier for the target device in the registration information stored by the cluster management apparatus. In this way, if the state information reported by the target device is not received within the preset length of time, the cluster management apparatus may first query the temporary departure identifier corresponding to the target device, still control the target device to belong to the device cluster network and, in a case where the target device is restored to the normal work subsequently if the temporary departure identifier is queried, directly continuous to manage the target device, and directly remove the target device from the device cluster network if the temporary departure identifier is not queried.

Figure 4:
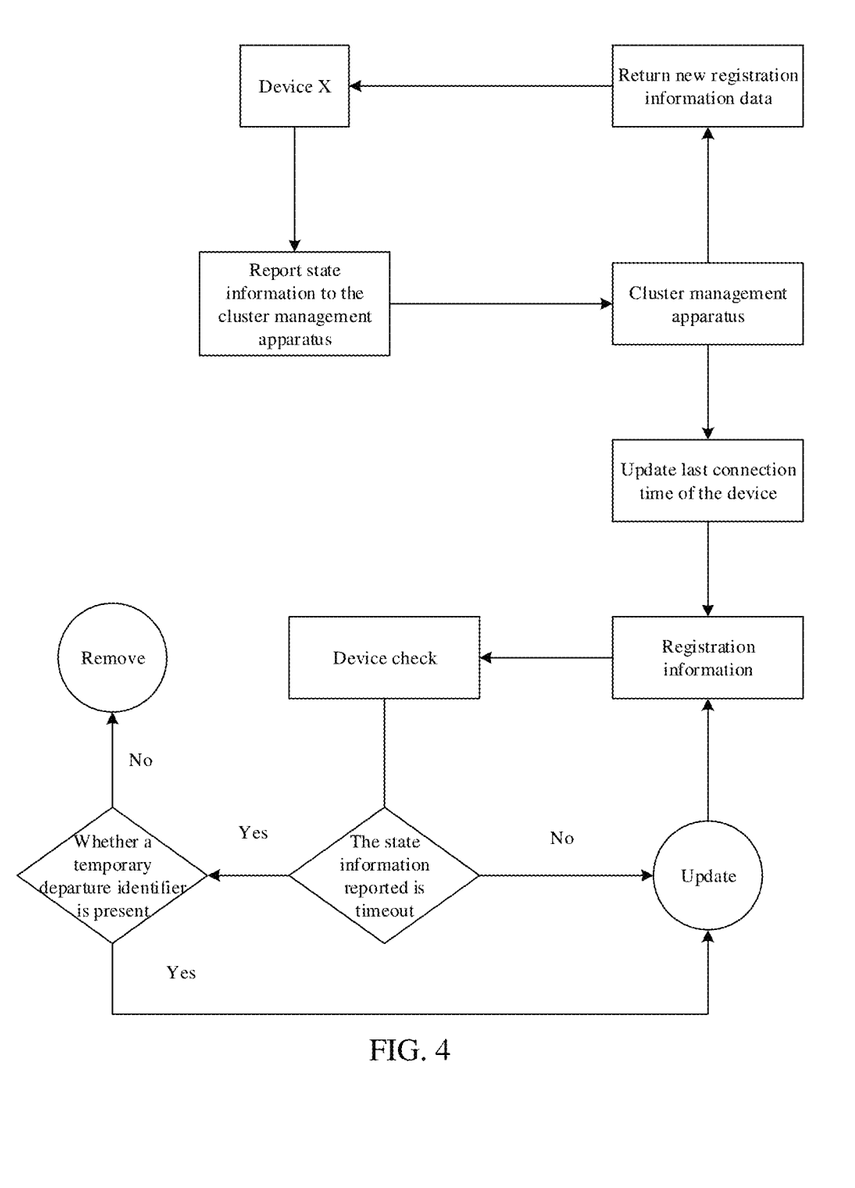
FIG. 4 is a schematic diagram of an exemplary flowchart of cluster management by a cluster management apparatus based on state information provided by an embodiment of the disclosure.

FIG. 4 is a schematic diagram of an exemplary flowchart of cluster management by a cluster management apparatus based on state information provided by an embodiment of the disclosure. As shown in FIG. 4, in the embodiment of the disclosure, the cluster management apparatus may receive state information reported by any device X in the device cluster network, thereby updating corresponding node information, and last connection time according to the information. In addition, for a device that does not report the state information timely in the network device cluster, whether a temporary departure identifier is present may be checked; if yes, node information of other devices may be continuously updated; and if no, the device that does not timely report the state information is removed from the device cluster network.

It is to be understood that, in the embodiment of the disclosure, the target device may automatically report the state information to the cluster management apparatus, the cluster management apparatus may timely update related information and the user is unnecessary to manually update the related information; and if not receiving the state information for a long time, the cluster management apparatus may automatically remove the target device and the target device is unnecessary to be manually removed by the user. Therefore, the efficiency and intelligence of the cluster management are improved.

The embodiment of the disclosure provides the cluster management method, which includes that: in a case where a registration request sent by a target device is received, identity information of the target device is acquired from the registration request; identity check is performed on the target device based on the identity information to obtain a check result; in a case where the check result is a check success, node information of the target device is acquired from the registration request; and the node information is stored to registration information of a device cluster network, to add the target device to the device cluster network. According to the cluster management method provided by the embodiment of the disclosure, the cluster management apparatus automatically discovers a target device needing to be added to the device cluster network, and adds the target device to the device cluster network in a case where the identity check on the target device succeeds, thereby improving efficiency and intelligence of the cluster management.

Figure 5:
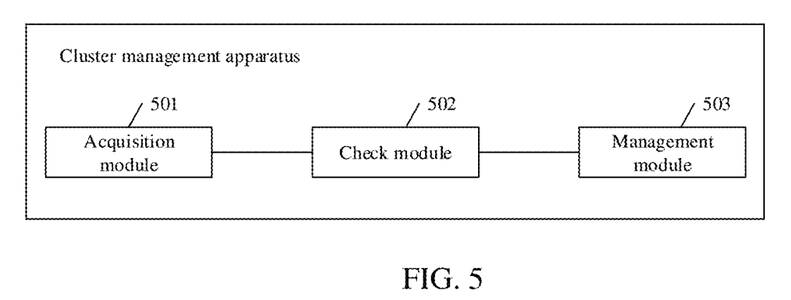
FIG. 5 is a structural schematic diagram of a cluster management apparatus provided by an embodiment of the disclosure.

The embodiments of the disclosure provide a cluster management apparatus. FIG. 5 is a structural schematic diagram of a cluster management apparatus provided by an embodiment of the disclosure. As shown in FIG. 5, the cluster management apparatus may include an acquisition module 501, a check module 502 and a management module 503.

The acquisition module 501 is configured to acquire, in a case where a registration request sent by a target device is received, identity information of the target device from the registration request.

The check module 502 is configured to perform identity check on the target device based on the identity information to obtain a check result.

The acquisition module 501 is further configured to acquire, in a case where the check result is a check success, node information of the target device from the registration request.

The management module 503 is configured to store the node information to registration information of the device cluster network, to add the target device to a device cluster network.

In an embodiment of the disclosure, the identity information may include attribute information and a digital certificate of the target device, and the check module 502 is specifically configured to perform effectiveness verification on the target device by using the attribute information to obtain a first verification result; perform legality verification on the digital certificate to obtain a second verification result; determine, in a case where both the first verification result and the second verification result are a verification success, that the check result is a check success; and/or determine, in a case where either the first verification result or the second verification result is a verification failure, that the check result is a check failure.

In an embodiment of the disclosure, the node information may include device information and network interface information of the target device, and the management module 503 is specifically configured to: search the network interface information from the registration information; update, in a case where the network interface information is found, device information associated with the network interface information in the registration information to the device information; and/or newly add, in a case where the network interface information is not found, the device information and the network interface information to the registration information.

In an embodiment of the disclosure, the management module 503 is further configured to update, in a case where state information reported by the target device is received, the node information in the registration information and last connection time of the target device according to the state information.

In an embodiment of the disclosure, the management module 503 is further configured to: query, in a case where state information reported by the target device is not received within a preset length of time, a temporary departure identifier corresponding to the target device from the registration information; retain, in a case where the temporary departure identifier is queried, the node information in the registration information; and/or delete, in a case where the temporary departure identifier is not queried, the node information from the registration information, to remove the target device from the device cluster network.

The embodiment of the disclosure provides the cluster management apparatus. In a case where a registration request sent by a target device is received, identity information of the target device is acquired from the registration request; identity check is performed on the target device based on the identity information to obtain a check result; in a case where the check result is a check success, node information of the target device is acquired from the registration request; and the node information is stored to registration information of a device cluster network, to add the target device to the device cluster network. According to the cluster management apparatus provided by the embodiment of the disclosure, the cluster management apparatus automatically discovers a target device needing to be added to the device cluster network, and adds the target device to the device cluster network in a case where the identity check on the target device succeeds, thereby improving efficiency and intelligence of the cluster management.

Figure 6:
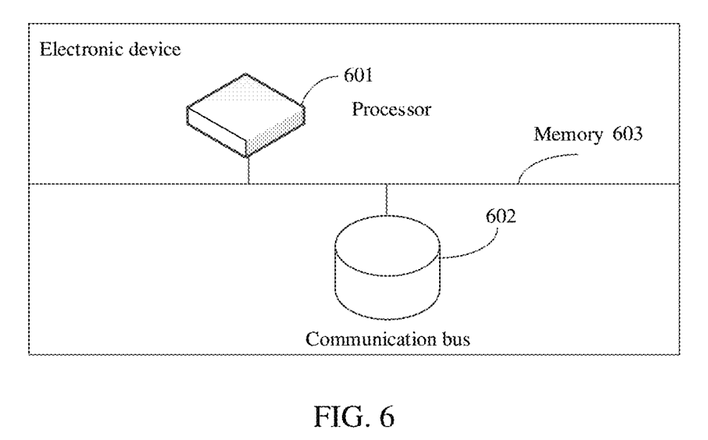
FIG. 6 is a structural schematic diagram of an electronic device provided by an embodiment of the disclosure.

The embodiments of the disclosure provide an electronic device. FIG. 6 is a structural schematic diagram of an electronic device provided by an embodiment of the disclosure. As shown in FIG. 6, the electronic device may include: a processor 601, a memory 602 and a communication bus 603.

The communication bus 603 is configured to implement connection and communication between the processor 601 and the memory 602.

The processor 601 is configured to execute one or more programs stored in the memory 602, to implement the cluster management method described above.

The embodiments of the disclosure further provide a computer-readable storage medium, which stores one or more programs; and the one or more programs may be executed by one or more processors, to implement the cluster management method. The computer readable storage may be a volatile memory such as a Random-Access Memory (RAM), or a non-volatile memory such as a Read-Only Memory (ROM), a flash memory, a Hard Disk Drive (HDD) or a Solid-State Drive (SSD), or may also be a device including any one or combination of the above memories, such as a mobile phone, a computer, a tablet and a PDA.

Those skilled in the art should understand that the embodiments of the disclosure can provide a method, a system or a computer program product. Thus, forms of hardware embodiments, software embodiments or embodiments integrating software and hardware can be adopted in the disclosure. Moreover, a form of the computer program product implemented on one or more computer available storage media (including, but not limited to, a disk memory, an optical memory and the like) containing computer available program codes can be adopted in the disclosure.

The disclosure is described with reference to flowcharts and/or block diagrams of the method, the device (system) and the computer program product according to the embodiments of the disclosure. It should be understood that each flow and/or block in the flowcharts and/or the block diagrams and a combination of the flows and/or the blocks in the flowcharts and/or the block diagrams can be realized by computer program instructions. These computer program instructions can be provided for a general computer, a dedicated computer, an embedded processor or processors of other programmable data processing devices to generate a machine, so that an apparatus for realizing functions assigned in one or more flows of the flowcharts and/or one or more blocks of the block diagrams is generated via instructions executed by the computers or the processors of the other programmable data processing devices.

These computer program instructions can also be stored in a computer readable memory capable of guiding the computers or the other programmable data processing devices to work in a specific mode, so that a manufactured product including an instruction apparatus is generated via the instructions stored in the computer readable memory, and the instruction apparatus realizes the functions assigned in one or more flows of the flowcharts and/or one or more blocks of the block diagrams.

These computer program instructions can also be loaded to the computers or the other programmable data processing devices, so that processing realized by the computers is generated by executing a series of operation steps on the computers or the other programmable devices, and therefore the instructions executed on the computers or the other programmable devices provide a step of realizing the functions assigned in one or more flows of the flowcharts and/or one or more blocks of the block diagrams.

The above are merely preferred embodiments of the disclosure, rather than a limit to the protection scope of the disclosure.

What is claimed is:

1. A cluster management method, comprising:
    acquiring, in a case where a registration request sent by a target device is received, identity information of the target device from the registration request;
    performing identity check on the target device based on the identity information to obtain a check result;
    acquiring, in a case where the check result is a check success, node information of the target device from the registration request; and
    storing the node information to registration information of a device cluster network, to add the target device to the device cluster network,
    wherein the identity information comprises attribute information and a digital certificate of the target device, and performing the identity check on the target device based on the identity information to obtain the check result comprises:
        performing effectiveness verification on the target device by using the attribute information to obtain a first verification result;
        performing legality verification on the digital certificate to obtain a second verification result; and
        performing at least one of following operations:
            determining, in a case where both the first verification result and the second verification result are a verification success, that the check result is a check success; or
            determining, in a case where either the first verification result or the second verification result is a verification failure, that the check result is a check failure.

2. The method of claim 1, wherein the node information comprises device information and network interface information of the target device, and storing the node information to the registration information of the device cluster network comprises:
    searching the network interface information from the registration information; and
    performing at least one of following operations:
        updating, in a case where the network interface information is found, device information associated with the network interface information in the registration information to the device information; or
        newly adding, in a case where the network interface information is not found, the device information and the network interface information to the registration information.

3. The method of claim 1, wherein after storing the node information to the registration information of the device cluster network, the method further comprises:
    updating, in a case where state information reported by the target device is received, the node information in the registration information and last connection time of the target device according to the state information.

4. The method of claim 1, wherein after storing the node information to the registration information of the device cluster network, the method further comprises:
    querying, in a case where state information reported by the target device is not received within a preset length of time, a temporary departure identifier corresponding to the target device from the registration information; and
    performing at least one of following operations
        retaining, in a case where the temporary departure identifier is queried, the node information in the registration information; or
        deleting, in a case where the temporary departure identifier is not queried, the node information from the registration information, to remove the target device from the device cluster network.

5. An electronic device, comprising a processor, a memory and a communication bus, wherein
    the communication bus is configured to implement connection and communication between the processor and the memory;
    the processor, when executing one or more programs stored in the memory, is configured to:
        acquire, in a case where a registration request sent by a target device is received, identity information of the target device from the registration request;
        perform identity check on the target device based on the identity information to obtain a check result;
        acquire, in a case where the check result is a check success, node information of the target device from the registration request; and
        store the node information to registration information of a device cluster network, to add the target device to the device cluster network,
        wherein the identity information comprises attribute information and a digital certificate of the target device, and the processor is further configured to:
            perform effectiveness verification on the target device by using the attribute information to obtain a first verification result;
            perform legality verification on the digital certificate to obtain a second verification result; and
            perform at least one of following operations:
                determining, in a case where both the first verification result and the second verification result are a verification success, that the check result is a check success; or
                determining, in a case where either the first verification result or the second verification result is a verification failure, that the check result is a check failure.

6. The electronic device of claim 5, wherein the node information comprises device information and network interface information of the target device, and the processor is further configured to:

search the network interface information from the registration information; and perform at least one of following operations:
updating, in a case where the network interface information is found, device information associated with the network interface information in the registration information to the device information; or
newly adding, in a case where the network interface information is not found, the device information and the network interface information to the registration information.

7. The electronic device of claim 5, wherein the processor is further configured to:
update, in a case where state information reported by the target device is received, the node information in the registration information and last connection time of the target device according to the state information.

8. The electronic device of claim 5, wherein the processor is further configured to:
query, in a case where state information reported by the target device is not received within a preset length of time, a temporary departure identifier corresponding to the target device from the registration information; and
perform at least one of following operations:
retaining, in a case where the temporary departure identifier is queried, the node information in the registration information; or
deleting, in a case where the temporary departure identifier is not queried, the node information from the registration information, to remove the target device from the device cluster network.

9. A nonvolatile computer-readable storage medium, storing one or more programs, wherein the one or more programs are executable by one or more processors, to:
acquire, in a case where a registration request sent by a target device is received, identity information of the target device from the registration request;
perform identity check on the target device based on the identity information to obtain a check result;
acquire, in a case where the check result is a check success, node information of the target device from the registration request; and
store the node information to registration information of a device cluster network, to add the target device to the device cluster network,
wherein the identity information comprises attribute information and a digital certificate of the target device, and the one or more programs are executable by one or more processors to:
perform effectiveness verification on the target device by using the attribute information to obtain a first verification result;
perform legality verification on the digital certificate to obtain a second verification result; and
perform at least one of following operations:
determining, in a case where both the first verification result and the second verification result are a verification success, that the check result is a check success; or
determining, in a case where either the first verification result or the second verification result is a verification failure, that the check result is a check failure.

10. The nonvolatile computer-readable storage medium of claim 9, wherein the node information comprises device information and network interface information of the target device, and the one or more programs are executable by one or more processors to:
search the network interface information from the registration information; and
perform at least one of following operations:
updating, in a case where the network interface information is found, device information associated with the network interface information in the registration information to the device information; or
newly adding, in a case where the network interface information is not found, the device information and the network interface information to the registration information.

11. The nonvolatile computer-readable storage medium of claim 9, wherein the one or more programs are executable by one or more processors to:
update, in a case where state information reported by the target device is received, the node information in the registration information and last connection time of the target device according to the state information.

12. The nonvolatile computer-readable storage medium of claim 9, wherein the one or more programs are executable by one or more processors, to:
query, in a case where state information reported by the target device is not received within a preset length of time, a temporary departure identifier corresponding to the target device from the registration information; and
perform at least one of following operations:
retaining, in a case where the temporary departure identifier is queried, the node information in the registration information; or
deleting, in a case where the temporary departure identifier is not queried, the node information from the registration information, to remove the target device from the device cluster network.

* * * * *